United States Patent Office 3,320,334
Patented May 16, 1967

3,320,334
POLY-ALPHA-OLEFIN PYRIDINIC POLYAMIDE COMPOSITIONS HAVING HIGH RECEPTIVITY TO DYESTUFFS
Alberto Bonvicini and Ennio Ildos, Terni, Italy, assignors to Montecatini Edison S.p.A., Milan, Italy
No Drawing. Filed May 21, 1962, Ser. No. 196,441
Claims priority, application Italy, May 23, 1961, 9,567/61
9 Claims. (Cl. 260—857)

The present invention relates to the production of thermoplastic compositions containing poly-alpha-olefins, which compositions are highly receptive to dyestuffs and particularly suitable for the preparation of textile fibers.

The poly-alpha-olefins which may be employed in the compositions of the present invention are preferably those obtained by low pressure polymerization in the presence of stereospecific catalysts, of one or more monomers such as ethylene, propylene, butene, 4-methyl-pentene-1 and the like.

Several processes have been described in the patent literature for the preparation of fibers from polyolefins alone.

These polyolefin fibers have very good mechanical and chemical characteristics, particularly high tenacity and good resistance to chemical agents. They exhibit, however, poor receptivity to dyestuffs.

Several methods have been described for obtaining dye-receptive fibers. These methods include the extrusion of blends of polyolefins with other polymeric substances, and treatments of the fiber, such as, graft polymerization processes, sulfonation and the like.

It is an object of the present invention to provide a process for the preparation of poly-alpha-olefin compositions having improved receptivity to dyestuffs regardless of type; these compositions therefore being particularly suitable for the production of fibers which possess not only the outstanding mechanical and chemical characteristics typical of polyolefin fibers, but which also exhibit excellent dyeability.

A further object of the present invention is to provide such poly-alpha-olefin compositions and various manufactured articles obtained therefrom, particularly textile fibers.

Further objects and advantages of the present invention will become apparent hereinafter.

The compositions of the present invention are obtained by admixing 1–25% by weight, based on the polyolefin, of a pyridinic polyamide, obtained by the polycondensation of iso-cinchomeronic acid (2,5-pyridinedicarboxylic acid) or its esters with an aliphatic diamine, with at least one polyolefin.

The polycondensation reaction for the preparation of these pyridinic polyamides is preferably carried out by heating (such as at 220–280° C.) 1 mol of isocinchomeronic acid or its esters with 1 mol of an amine, such as, preferably, hexamethylenediamine, in the presence or absence of suitable solvents and condensing agents.

The blending of the pyridinic polyamides with one or more polyolefins is effected by simply admixing them at room temperature, in a Henschel-type apparatus, Werner-type apparatus, a ball mill, or in any suitable apparatus. The mix thus obtained is melt granulated in a device provided with a screw and then is shaped by extrusion, preferably in a melt spinning device, while working in the absence of air and preferably under an inert gas.

The blends can be shaped or spun, if desired, in the presence of a small amount of a solid dispersing agent which promotes the homogeneous dispersion of the nitrogen-containing product in the mass of the olefin polymer.

Any suitable solid dispersing agent may be employed. This agent is selected preferably from the group comprising cetyl and stearyl alcohols, stearic and terephthalic acids, benzoin, furoin, vinyl stearate, mono-, di- and tri-stearic esters of pentaerythritol, monoethanol amine stearate, stearamide, N-diethanol lauramide, $C_6$–$C_{30}$ aliphatic amines, condensation products of ethylene oxide with alcohols, amines and phenols, polystearamide, polyacrylic acid, polystyrene and styrene copolymers and terpenic polymers.

The use of these dispersing agents is optional and they may be omitted if so desired.

The filaments, which are prepared by extrusion of the blends of the present invention, can be mono- or pluri-filaments and may be used for the preparation of continuous, bulk or staple yarn.

The mono- or pluri-filaments according to the present invention can undergo treatments which further improve their dyeability and mainly the fastness of the dyeing. Particularly suitable for this purpose are the treatments with formaldehyde, with diisocyanates, with monomers capable of giving tridimensional structures, such as divinyl-benzenes, vinyl-acetylenes and similar compounds, or treatments with diepoxy compounds.

These treatments may be carried out on the fibers before or after stretching.

The stretching of the fibers is carried out using suitable stretching ratios such as those between 1:2 and 1:10, at temperatures between 80 and 150° C., in stretching devices heated with warm air, steam or similar fluids.

The spinning of the compositions of the present invention occurs preferably by extrusion through spinnerets having holes with ratios of length to diameter higher than 1.

The fibers thus produced show a remarkable receptivity to acid, metallized and plastosoluble (dispersed) dyestuffs. These fibers also have a good affinity for basic and vat dyes. The fibers also exhibit an increased fastness particularly to light.

The following examples are given to illustrate the present invention, but it is to be understood that the invention is not limited thereto. As is known to the art subsequent to the discoveries of Natta et al., and as will be seen from the presence of a polypropylene heptane residue, the polypropylene employed in these examples consists prevailingly (more than 50%) of isotactic macromolecules.

Unless otherwise indicated, all parts and proportions are by weight.

Although the production of fibers is specifically exemplified in the following working examples, the present invention is suitable for improving the dye-receptivity of poly-alpha-olefin compositions regardless of specific physical shape. Thus, the dye-receptivity of various other shaped articles, such as films, sheets and various other manufactured articles may be improved.

*Example 1*

Into a 1-liter flask, provided with thermometer and Markusson device, which allows for the removal of the water formed during the reaction, are introduced the following:

| | G. |
|---|---|
| Isocinchomeronic acid (1 mol) | 135 |
| Hexamethylenediamine (1 mol) | 167 |

The mass is heated to 220–230° C. for several hours under an inert gas.

The polyamide thus formed, which is poured from the flask in the molten state, cooled and powdered, shows a softening point of about 100° C.

In a Henschel-mixer, at room temperature, a mix containing the following is prepared:

| | Kg. |
|---|---|
| Polypropylene | 3.800 |
| Polyamide | 0.200 |

The characteristics of the polypropylene used are: $[\eta]=1.43$ (as measured in tetralin at 135° C.); ash content=0.03%; residue after heptane extraction=95.7%. The mix is granulated and then extruded by means of a melt-spinning apparatus of the type described in Italian Patent 614,043, which is provided with spinnerets as described in Italian Patent 600,246.

The following conditions are utilized:

| | |
|---|---|
| Temperature of the screw, ° C. | 240 |
| Temperature of the spinning head, ° C. | 245 |
| Temperature of the spinneret, ° C. | 240 |
| Type of spinneret, mm. | 60/0.8 x 16 |
| Max. Pressure, kg./cm.² | 58 |
| Winding rate, m./min. | 180 |

The yarn is stretched in a steam heated device, at the temperature of 130° C., with a stretching ratio of 1:4.5, and then undergoes a dimensional stabilization under free shrinking, at 110° C. for 15′, according to the procedure described in Italian Patent 566,914.

The serimetrical characteristics of the drawn and stabilized yarn are as follows:

| | |
|---|---|
| Tenacity, g./den. | 5.1 |
| Elongation, percent | 22 |

Then the yarn is curled and cut into staple having a length of 9 cm., according to the practice of Italian Patent 580,411.

The staple thus obtained is dyed with the following dyes:

Alizarine yellow 2G (C.I. mordant yellow 1) (acid)
Red for wool B (C.I. acid red 115) (acid)
Alizarine red S (C.I. mordant red 3) (acid)
Alizarine blue SE (C.I. acid blue 43) (acid)
Acid black JVS (C.I. acid black 1) (acid)
Lanasyn yellow GLN (C.I. acid yellow 112) (metallized)
Lanasyn red 2 GL (C.I. acid red 216) (metallized)
Lanasyn brown 3 RL (C.I. acid brown 30) (metallized)
Setacyl yellow 3G (C.I. disperse yellow 20) (plastisoluble)
Scarlet Ciba BR (C.I. disperse red 18) (plastisoluble)
Setacyl brilliant blue BG (C.I. disperse blue 3) (plastisoluble)

The dyeings are carried out in baths containing 2.5% of the dye calculated on the weight of the fiber, with a fiber/bath ratio of 1:40, while maintaining the boiling temperature for 90 minutes.

The dyeings with acid and metallized dyes are carried out in the presence of 3% ammonium acetate (calculated on the weight of the fiber) and of 1% of a surfactant consisting of the condensation product of ethylene oxide and p-cresol. Thirty minutes from the beginning of the boiling, 2% (calculated on the weight of the fiber) of a 10% acetic acid solution is added in order to improve the exhaustion of the baths. The dyeings with plastisol dyestuffs are carried out in the presence of 2% of surfactant (calculated on the weight of the fiber).

The yarns, after the dyeing, are washed with running water, and are seen to be intensely dyed with acid, metallized and plastisoluble dyestuffs. The fastness of the dyeings to light, washing and rubbing is shown to be very satisfactory.

A further improvement of the fastness of the dyeings is obtained by treating the fibers before dyeing with a 5% aqueous solution of ethyleneglycol diglycidylether for 20″ at 25° C. and then drying them in an oven at 70° C.

*Example 2*

A polyamide is prepared according to the process described in the literature (Akisa Okada, al. Yuki Gosci Kegaku Kyokai Shi 16, 252–5, 1958; Akisa Okada, al. Yuki Gosci Kegaku Kyoshi Shi, 16, 458–60, 1958; Akisa Okada, Japanese Patent 9594 (1957)–C.A. 1958, 14222d, 15953c, 17723d) by introducing into a 1-litre flask, provided with a thermometer and a Markusson apparatus, which allows for the removal of the water formed during the reaction, the following reactants:

| | G. |
|---|---|
| Methyl ester of isocinchomeronic acid (1.1 mol) | 210 |
| Hexamethylenediamine (1.1 mol) | 131 |
| Meta-cresol | 3 |

The mass is heated at 180–190° C. under an inert gas. It is then poured into alcohol, filtered, washed with an alcohol/ether (50/50 by volume) mixture and the powder thus obtained is heated for 5 hours at 270–280° C. under reduced pressure (residual pressure 5 mm. Hg).

The polyamide thus obtained shows a melting point of 264° C. A blend is prepared, at room temperature, in a Henschel-mixer, containing: 2.790 of polypropylene and 0.210 kg. of the polyamide.

The characteristics of the polypropylene used are the following:

$[\eta]=1.43$ (as measured in tetralin at 135° C.);
ash content=0.03%;
residue after heptane extraction=95.7%.

The blend is granulated and then extruded, by means of a melt-spinning apparatus, as described in Example 1, under the following conditions:

| | |
|---|---|
| Spinning head temperature, ° C. | 240 |
| Screw temperature, ° C. | 240 |
| Spinneret temperature, ° C. | 230 |
| Type of spinneret, mm. | 60/0.8 x 16 |
| Max. pressure, kg./cm.² | 61 |
| Winding rate, m./min. | 191 |

The yarn is stretched in a steam-heated device at a temperature of 130° C., with a stretching ratio of 1:4.5.

The yarn is then subjected to a dimensional stabilization under free shrinkage, at 110° C. for 15′, according to the procedure of Italian Patent 566,914.

The serimetrical characteristics of the stretched yarn which has been also thermostabilized are the following:

| | |
|---|---|
| Tenacity, g./den. | 5.02 |
| Elongation, percent | 21.5 |

The yarn is then curled to staple yarn having a length of 9 cm., in the manner described in Italian Patent 580,411.

Upon dyeing the finished yarn with the dyes used in Example 1, intense, fast shades are produced.

A further improvement of the fastness of the dye shades is obtained by treating the fibers before dyeing with a 3% aqueous solution of ethyleneglycol diglycidylether for 20″ at 25° C. and then drying them is an oven at 70° C.

*Example 3*

A blend is prepared at room temperature, in a Henschel-mixer, of the following:

| | Kg. |
|---|---|
| Polypropylene | 2.700 |
| Polyamide prepared according to Example 1 | 0.300 |

The characteristics of the polypropylene used are the following:

$[\eta]=1.43$ (as measured in tetralin at 135° C.);
ash content=0.03%;
residue after heptane extraction=95.7%.

The blend is granulated and then extruded, by means of a melt spinning device of the type used in Example 1, under the following conditions:

| | |
|---|---|
| Screw temperature, °C. | 240 |
| Spinning head temperature, °C. | 240 |
| Spinneret temperature, °C. | 230 |
| Type of spinneret, mm. | 60/0.8 x 16 |
| Max. pressure, kg./cm.$^2$ | 55 |
| Winding rate, m./min. | 170 |

The yarn is stretched in steam heated device, at 130° C., with a stretching ratio of 1:4.5.

The yarn is then subjected to a dimensional stabilization under free shrinkage, at 110° C., for 15′, according to Italian Patent 566,914.

The serimetrical characteristics of the stretched and thermo-stabilized yarn are the following:

| | |
|---|---|
| Tenacity, g./den. | 5.3 |
| Elongacity, percent | 23 |

The yarn is then curled and cut into staple having the length of 9 cm., according to Italian Patent 580,411.

Upon dyeing the finished yarn with the dyes of Example 1, intense, fast shades are obtained.

A further improvement of the fastness of the dyeings may be obtained by treating the fibers, before dyeing, with a 5% aqueous solution of ethyleneglycol diglcidylether for 20″ at 25° C., followed by drying in a stove at 70° C.

Many variations and modifications can, of course, be practiced without departing from the spirit and scope of the present invention. The invention is not limited except as defined in the following claims.

Having thus described the invention, what it is desired to secure and claim by Letters Patent is:

1. A polymer composition having a high dye receptivity, containing at least one poly-alpha-olefin and 1–25%, based on the weight of poly-alpha-olefin, of a pyridinic polyamide poly-condensation product of a member selected from the group consisting of isocinchomeronic acid and its esters with at least one aliphatic diamine.

2. The polymer composition of claim 1, wherein the poly-alpha-olefin is polypropylene consisting prevailingly of isotactic macromolecules.

3. The polymer composition of claim 1, wherein the pyridinic polyamide is the polycondensation product of isocinchomeronic acid and hexamethylenediamine.

4. The polymer composition of claim 1, containing 0.1–5%, based on the total weight of the composition, of a solid dispersing agent.

5. A process for producing dye-receptive polymer compositions, which comprises admixing at least one poly-alpha-olefin with 1–25%, by weight of poly-alpha-olefin, of a pyridinic polyamide poly-condensation product of isocinchomeronic acid or its esters with at least one aliphatic diamine.

6. The process of claim 5, wherein the polyolefin is polypropylene consisting prevailingly of isotactic macromolecules.

7. The process of claim 5, wherein the pyridinic polyamide is the polycondensation product of isocinchomeronic acid and hexamethylenediamine.

8. Dye-receptive textile fibers obtained by the process of claim 5.

9. Dye-receptive shaped articles other than fibers obtained by the process of claim 5.

References Cited by the Examiner

UNITED STATES PATENTS

| | | | |
|---|---|---|---|
| 2,367,173 | 1/1945 | Martin | 18—54 |
| 2,833,740 | 5/1958 | Verbanc | 260—857 |
| 2,947,598 | 8/1960 | Maragliano et al. | 18—54 |
| 3,038,876 | 6/1962 | Farago | 260—857 |
| 3,107,228 | 10/1963 | Cappuccio et al. | 8—55 |
| 3,112,159 | 11/1963 | Cappuccio et al. | 8—55 |
| 3,115,478 | 12/1963 | Giustiniani et al. | 8—55 |

FOREIGN PATENTS 9,594   1957   Japan.

MURRAY TILLMAN, *Primary Examiner.*

W. J. STEPHENSON, WILLIAM H. SHORT, C. B. HAMBURG, J. W. SANNER, *Assistant Examiners.*